Feb. 11, 1958 D. E. DAVIS 2,822,555
DIE STOCK FOR RETHREADING WORM THREADS
Filed Feb. 21, 1955
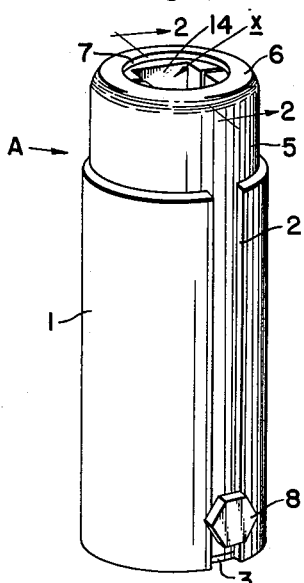
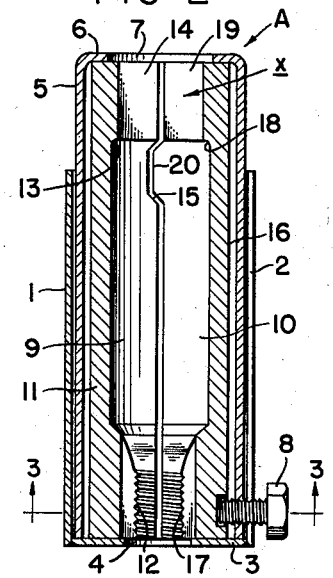
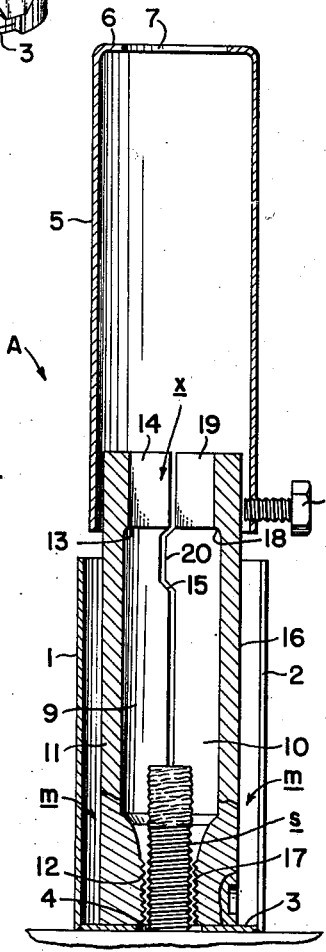
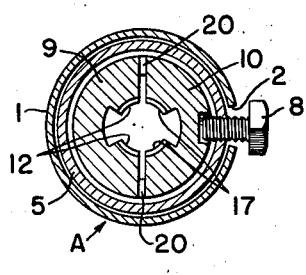
INVENTOR.
DANIEL E. DAVIS
BY
ATTORNEY

United States Patent Office 2,822,555
Patented Feb. 11, 1958

2,822,555

DIE STOCK FOR RETHREADING WORM THREADS

Daniel E. Davis, Joplin, Mo.

Application February 21, 1955, Serial No. 489,385

2 Claims. (Cl. 10—1)

This invention relates in general to certain new and useful improvements in thread repairing tools and, more particularly, to a stud-die which can be employed for recutting and rethreading threaded studs or bolts in situ.

In various types of mechanical repair work, it becomes necessary to repair the studs or bolts by which various parts are held together. For instance, an automobile cylinder block is provided with a plurality of upstanding threaded studs which pass through apertures in the cylinder head gasket and the cylinder head to receive nuts by which the cylinder head can be drawn down tightly into place. These studs must be very securely and tightly mounted in the cylinder block in order to withstand the force applied thereto when the nuts are tightened with a wrench and, furthermore, are usually threaded down quite close to the cylinder block face. Consequently, if the threads on one or more of such studs have become partially stripped, burred, or otherwise damaged, the stud must be removed and replaced or repaired, which, by conventional methods, is a very difficult and time-consuming job. It is not feasible to place a conventional thread-cutting stock-and-die against the outer end of the stud because there is no sure way to start the re-run threads so that they will coincide precisely with the undamaged threads along the outer parts of the stud. Furthermore, conventional thread-cutting tools cannot be used on short studs or where it is necessary to run a thread down close to the surface of the cylinder block or other machine part in which such stud is mounted.

It is, therefore, the primary object of the present invention to provide a stud-die which is adapted to recondition damaged threads on studs so that the reconditioned threads will run precisely and accurately into and form a part of existing threads.

It is another object of the present invention to provide a stud-die of the type stated, which can be conveniently and quickly set up around a stud in such a manner that the thread-cutting elements of the die will initially be engaged with, and guided by, the undamaged portion of the threads on the stud.

It is a further object of the present invention to provide a stud-die of the type stated which is capable of reconditioning undersized threads and preventing damage to the threads from cuttings, chips, or similar debris resulting from the reconditioning operation.

With the above and other objects in view, my invention resides in the novel features of form, construction, arrangement, and combination of parts presently described and pointed out in the claims.

In the accompanying drawings

Figure 1 is a perspective view of stud-die constructed in accordance with and embodying the present invention;

Figure 2 is a vertical sectional view taken along line 2—2 of Figure 1;

Figure 3 is a transverse sectional view taken along line 3—3 of Figure 2;

Figure 4 is a vertical sectional view showing the stud-die of the present invention in preliminary position around a damaged stud preparatory to reconditioning the threads thereof; and Figure 5 is a perspective view of accessory shims which form a part of the present invention and are used in reconditioning undersized threads.

Referring now in more detail and by reference characters to the drawings, which illustrate a preferred embodiment of the present invention, A designates a stud-die comprising an outer open-topped cylindrical sleeve 1 provided along one side with a narrow axial slot 2 and across its bottom with a circular disk 3 having a central aperture 4. The disk 3 may be marginally welded to the sleeve 1 or may be formed integrally therewith, depending upon convenience in fabrication, and the aperture 4 should be substantially larger than the outside diametral size of the stud which the stud-die A is designed to fit. Loosely fitted within the sleeve 1 for vertically shifting movement with respect thereto is an open-bottomed cylindrical socket 5 integrally provided with an annular top-flange or rim 6, which defines a relatively large concentric aperture 7. Threadedly mounted in, and extending radially through the socket 5, is a set-screw 8, which fits loosely in the slot 2 of the sleeve 1.

Disposed more or less concentrically within the socket 5 are two companion-shaped dies 9, 10, each formed of hardened tool steel. The die 9 comprises an elongated somewhat hemi-cylindrical element 11 integrally provided at its lower end with thread-cutting teeth 12 and at its upper end with an internal shoulder 13, the inner face of which is formed with a U-shaped recess 14. Along its vertical margins, the element 11 is provided with shallow indented recesses 15 having inwardly converging margins, as best seen in Figures 2 and 4.

The die 10 similarly comprises an elongated somewhat hemi-cylindrical element 16 provided at its lower end with thread-cutting teeth 17, which match the cutting teeth 12. At its upper end, the element 16 is integrally provided with an internal shoulder 18, the inner face of which is formed with a U-shaped recess 19 that matches the recess 14 and, together with it, forms a square aperture $x$ for receiving the complementarily-shaped shank of a bit or turning handle, the latter being conventional and, therefore, not shown in the drawings. The vertical margins of the element 16 are provided with projecting ears 20 which fit into the recesses 15 of the element 11.

In use, the sleeve 1, the socket 5 and the dies 9, 10, are disassembled and the sleeve dropped down over the stud $s$, as shown in Figure 4. Thereupon, the dies 9, 10, are inserted and eased into position against the lower undamaged portion of the threads. Preferably the space $m$ in the lower portion of the sleeve may be filled with heavy cup-grease to catch the chips and lubricate the die-teeth 12, 17. Thereupon, the socket 5 is lowered around the dies 9, 10, so that the set-screw slides freely in the slot 2 and the flange 6 rests upon the upper ends of the dies 9, 10, as shown in Figure 2. The set-screw 8 is then tightened to draw dies 9, 10, and the socket 5 into rigid assembled relation urging the cutting teeth 12, 17, into seated engagement against the threads of the stud $s$. Finally, a conventional bit or handle is inserted into the aperture $x$ and the stud-die A backed off. The undamaged lower portion of the threads will serve as a guide and the damaged upper portion of the threads will thus be precisely and accurately reconditioned. It will be understood in this connection that by locating and temporarily holding the sleeve 1 at any height with reference to a stud it is possible to start the teeth 12, 17, at any desired portion of the threads. As soon as the stud-die A has been assembled or set-up around the stud, the sleeve can be released. Then, by turning the stud-die A in the proper direction, the teeth 12, 17, can be caused to move up or down along the stud, as desired. It is also possible to employ arcuate shims 21, 22, which fit between the dies 9, 10, and the socket 5, and are preferably champered along their upper margins, as shown in Figure 5, to facilitate insertion of the socket 5 for reconditioning undersized threads. It will, of course, be understood that shims of various thicknesses may, if necessary, be supplied to afford a range of adjustment for varying degrees of undersized conditions.

It should be understood that changes and modifications in the form, construction, arrangement, and combination of the several parts of the thread repairing tools may be made and substituted for those herein shown and described without departing from the nature and principle of my invention.

Having thus described my invention, what I claim and desire to secure by letters patent is:

1. A stud-die adapted for use with a turning tool having a projecting shank, said stud-die comprising an outer shell having a flush, flat-bottomed wall having an aperture adapted for fitting around a threaded stud and being provided with an axial slot which extends longitudinally substantially the length thereof, an intermediate shell telescopically fitted within the outer shell and being open at both ends, said intermediate shell being axially shiftable with respect to the outer shell, a plurality of thread-cutting die elements loosely disposed within the intermediate shell and being adapted for radial separation in relation to each other so as to fit loosely around the stud which is to be threaded, said die elements being shaped at their upper ends to form a socket for engagement with the shank in such a manner that the stud-die can be turned by the shank, and a clamping screw threadedly mounted in and projecting loosely within the axial slot for urging the die elements and intermediate shell into rigid assembly for thread-cutting engagement with the stud.

2. A stud-die in accordance with claim 1 wherein a plurality of arcuate shims are positioned between the die elements and intermediate shell.

References Cited in the file of this patent

UNITED STATES PATENTS

| | | |
|---|---|---|
| 519,734 | Putnam | May 15, 1894 |
| 1,160,042 | Carpenter | Nov. 9, 1915 |
| 1,392,705 | Rhodes | Oct. 4, 1921 |
| 1,433,163 | Walters | Oct. 24, 1922 |
| 1,488,770 | Wells | Apr. 1, 1924 |
| 1,583,554 | Hoover | May 4, 1926 |